United States Patent Office 3,264,345
Patented August 2, 1966

3,264,345
17α-AMINO - 17β-METHYL - D - HOMOANDROST-5-ENE - 3β,17a - DIOL DERIVATIVES AND SALTS THEREOF
George W. Moersch and Duane F. Morrow, Ann Arbor, Mich., assignors to Parke, Davis & Company, Detroit, Mich., a corporation of Michigan
No Drawing. Filed Oct. 7, 1964, Ser. No. 402,350
6 Claims. (Cl. 260—501)

This application is a continuation-in-part of U.S. application Serial Number 239,819, filed November 23, 1962, and now abandoned.

This invention relates to novel homoamino steroid compounds of the androstene series. More particularly, it relates to D-homoandrost-5-ene-3β,17a-diol compounds, which can be represented by the formula

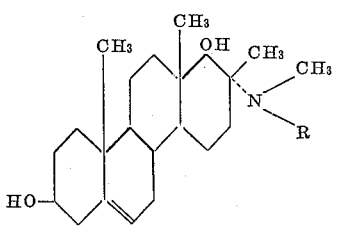

to acid-addition salts thereof, and to methods for their production. In the foregoing formula R represents hydrogen or a lower alkyl radical. When R is lower alkyl, it contains fewer than 4 carbon atoms and is preferably methyl or ethyl.

In accordance with the invention, compounds of the foregoing formula can be produced by the reduction of D-homoandrost-5-ene-17a-one compounds of the formula

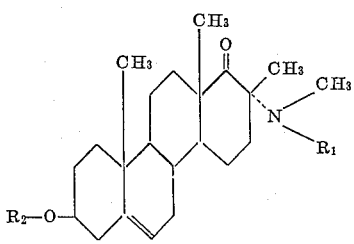

where each $R_1$ and $R_2$ represents hydrogen or a lower alkanoyl radical containing fewer than 4 carbon atoms. The reduction is preferably carried out by reacting the D-homoandrost-5-ene-3β-ol-17a-one compound with lithium and hydrolyzing the reaction product by treatment with an aqueous medium. Equivalent amounts of the steroid compound and lithium aluminum hydride can be employed, but preferably the reducing agent is employed in excess. The temperature may be varied over the range from 0° C. to about 65° C.; for best results temperatures between 15 and 50° C. and a reaction time of 2 to 15 hours are employed. Suitable solvents for the reduction reaction are the aliphatic and alicyclic ethers such as diethyl ether, dioxane, tetrahydrofuran, dimethoxyethane and the like and mixtures of these with hydrocarbon solvents such as benzene, toluene, xylene and the like. Following reaction with lithium aluminum hydride, the reaction mixture is hydrolyzed with an aqueous medium such as water, dilute aqueous inorganic acids or bases and other media containing water. While in ordinary practice an excess of the aqueous medium is added, the amount of water present should be at least four moles for each mole of lithium aluminum hydride.

17α - methylamino - 17β - methyl - D - homoandrost-5-ene-3β-ol-17a-one, having the formula

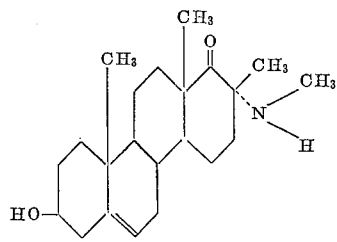

which is one of the starting materials employed in the practice of this invention can be prepared by heating 17aα-methyl-D-homoandrost-5-ene-3β,17aβ-diol-17-one of the formula

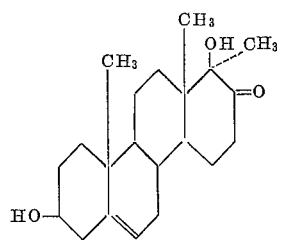

or its epimer (at carbon atom 17a) with liquid methylamine under pressure. The D-homoandrost-5-ene-17a-one compounds of the formula

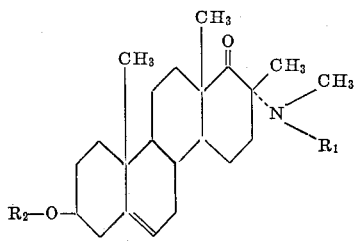

where each of $R_1$ and $R_2$ is a lower alkanoyl radical, which are also starting materials employed in the practice of this invention, can be prepared by reacting 17α-methylamino - 17β - methyl - D - homoandrost - 5 - ene-3β-ol-17a-one, of the aforementioned formula, with a suitable acylating agent such as a mixture of formic acid and acetic anhydride or acetic anhydride alone. The D-homoandrost-5-ene-17a-one compounds of the above formula, where $R_2$ is hydrogen, which can also be used in the practice of the invention, are prepared by saponification in aqueous base of the ester group (at carbon atom 3) of the D-homoandrost-5-ene-17a-one compounds of the above formula, where $R_2$ is a lower alkanoyl radical.

The free base compounds of the invention form acid-addition salts with a variety of inorganic and organic acids. Non-toxic salts are formed by the reaction of the free bases with such acids as hydrochloric, hydrobromic, hydriodic, sulfuric, acetic, benzoic, citric, tartaric, maleic, and related acids. The salt formation is suitably carried out by reacting the selected base with the selected acid in an unreactive solvent. The acid-addition salts can be converted to the free bases by reaction with a base such as sodium carbonate or potassium carbonate. In the applications of this invention, the compounds are preferably employed in the form of acid-addition salts.

The compounds of the invention are useful pharmacological agents. They are capable of regulating the electrolyte balance of the body fluids, being adapted to block the effect of desoxycorticosterone acetate and aldosterone on urinary sodium and potassium levels. They are active upon parenteral administration.

The invention is illustrated by the following examples:

*Example 1*

A mixture containing 752 mg. of 17α-methylamino-17β - methyl - D - homoandrost - 5 - ene - 3β - ol - 17a-one and 1.0 g. of lithium aluminum hydride in 375 ml. of anhydrous diethyl ether and 100 ml. of benzene is stirred at room temperature for 5 hours. After water is carefully added to decompose the reaction mixture, the mixture is diluted with benzene and 250 ml. of a saturated aqueous sodium potassium tartrate solution is added. The separated organic phase is isolated, dried over anhydrous magnesium sulfate, and concentrated to dryness under reduced pressure. The 17α-methylamino-17β-methyl-D-homoandrost-5-ene-3β,17a-diol obtained is triturated with ether, isolated by filtration, and dried in vacuo.

The hydrochloride salt of 17α - methylamino - 17β-methyl-D-homoandrost-5-ene-3β,17a-diol is prepared by dissolving the free base in methanol and treating the resulting solution with an excess of dry hydrogen chloride. The product obtained after removal of the solvent by distillation under reduced pressure is purified by recrystallization from isopropyl alcohol; M.P. >300° C.

The 17α - methylamino - 17β - methyl - D - homoandrost-5-ene-3β-ol-17a-one used as starting material is prepared as follows:

A mixture containing 7.84 g. of 17aα-methyl-D-homoandrost - 5 - ene - 3β,17aβ - diol - 17 - one (the epimeric 17aβ-methyl-D-homoandrost-5-ene-3β,17aα-diol-17-one may also be used) and 80 g. of liquid methylamine is heated under pressure in a pressure vessel at 194–198° C. for ten hours. The reaction mixture is allowed to cool, the excess methylamine is vented, and the residue is dissolved in methanol. The methanolic solution is filtered and the filtrate is concentrated to dryness under reduced pressure. The residue is dissolved in 80 ml. of isopropyl alcohol, 10 ml. of 12 N hydrochloric acid is added, and the mixture is heated on the steam bath for two hours. Upon filtration of the cooled mixture, there is obtained the hydrochloride salt of 17α - methylamino - 17β - methyl - D - homoandrost-5-ene-3β-ol-17a-one. The salt can be recrystallized from a methanol-ethyl acetate solvent mixture; M.P. >310° C.; $[\alpha]_D^{24}$ −22.5° (1% in methanol).

The free base, 17α-methylamino-17β-methyl-D-homoandrost-5-ene-3β-ol-17a-one, can be prepared by treating the hydrochloride salt with an equivalent amount of sodium carbonate in aqueous solution. The free base can be recrystallized from methanol; M.P. 205–207° C.; $[\alpha]_D^{24}$ −17.4° (1% in methanol).

*Example 2*

A mixture containing 2.61 g. of N-(3β-hydroxy-17β-methyl - D - homoandrost - 5 - ene - 17a - one - 17α - yl) - N-methylformamide and 3.5 g. of lithium aluminum hydride in 300 ml. of dry tetrahydrofuran and 200 ml. of dry diethyl ether is stirred at room temperature overnight. Water is added to hydrolyze the reaction mixture, and 250 ml. of a saturated aqueous sodium potassium tartrate solution is added. The separated organic phase is isolated, the aqueous phase is extracted with ether, and the ether extracts are combined with the organic phase. After drying over anhydrous magnesium sulfate, the organic phase is concentrated to near dryness, and the residue is isolated by filtration to give 17α-dimethylamino - 17β - methyl - D - homoandrost - 5 - ene-3β,17a-diol, which can be recrystallized from ethanol; M.P. 235–235.5° C.

The hydrochloride salt is prepared by dissolving the free base in ether and treating the resulting solution with an excess of dry hydrogen chloride. The product obtained after cooling and filtration is recrystallized from isopropyl alcohol; M.P. 247–250° C.

The L(+)-tartrate salt is prepared by dissolving the free base in ether and adding the ethereal solution to a solution of d-tartaric acid in ether. The precipitate obtained is isolated by filtration and dried in vacuo; M.P. 214–216° C.

In a similar manner the citrate salt is prepared from the free base and citric acid; M.P. 219–222° C.

The N-(3β-hydroxy - 17β - methyl - D - homoandrost-5-ene-17a-one-17α-yl)-N-methylformamide used as starting material can be prepared as follows:

A solution of 5.0 g. of 17α-methylamino-17β-methyl-D-homoandrost-5-ene-3β-ol-17a-one in a mixture of 50 ml. of 98% formic acid and 32 ml. of acetic anhydride is heated under reflux for 7 hours. The solution is allowed to cool, is poured into water, and the precipitate obtained is isolated by filtration. The solid is dissolved in methylene chloride, the solution is dried over anhydrous magnesium sulfate and the dried solution is concentrated to near dryness. After isolation by filtration, the crude N-(3β-formyl-17β-methyl - D - homoandrost - 5-ene - 17a-one-17α-yl)-N-methylformamide is dissolved in 900 ml. of methanol, a solution of 4.2 g. of sodium hydroxide in 10 ml. of water is added, and the mixture is allowed to stand at room temperature for one hour. After neutralization with acetic acid, the mixture is concentrated under reduced pressure, poured into water, and the solid obtained is isolated by filtration and dried. The N - (3β - hydroxy - 17β - methyl - D - homoandrost - 5-ene-17a - one-17α-yl)-N-methylformamide can be recrystallized from methanol; M.P. 210–212° C.

*Example 3*

A solution of 500 mg. of N - (3β - hydroxy17β-methyl-D - homoandrost - 5 - ene - 17a - one - 17α - yl) - N-methylacetamide in 75 ml. of dry tetrahydrofuran and 50 ml. of dry diethyl ether is added to a suspension of 500 mg. of lithium aluminum hydride in 50 ml. of dry diethyl ether, and the mixture is stirred at room temperature overnight. A saturated aqueous sodium potassium tartrate solution (50 ml.) is added, the resulting mixture is stirred for one hour, and the separated organic and aqueous phases are isolated. The aqueous phase is extracted with diethyl ether, the extracts are combined with the organic phase, and the organic solution is dried over anhydrous magnesium sulfate. The dried solution is evaporated to dryness to give 17α - methylethylamino-17β - methyl - D - homoandrost - 5 - ene - 3β,17a - diol; M.P. 137–150° C.

The hydrochloride salt is prepared by dissolving the free base in ether and treating the resulting solution with an excess of dry hydrogen chloride. The product obtained is isolated by filtration and can be recrystallized from isopropyl alcohol; M.P. 254–256° C.

The N - (3β - hydroxy - 17β - methyl - D-homoandrost-5-ene-17a-one-17α-yl)-N-methylacetamide used as starting material can be prepared by treating 17α-methylamino - 17β - methyl - D - homoandrost - 5 - ene - 3β-ol-17a-one with acetic anhydride at room temperature for 88 hours, and then saponifying the resulting N-(3β-acetoxy - 17β - methyl - D - homoandrost - 5 - ene - 17a-one-17α-yl)-N-methylacetamide with aqueous sodium hydroxide in methanol to give the desired product; M.P. 243–245° C.

We claim:

1. A member of the class consisting of D-homoandrost-5-ene-3β,17a-diol compounds, having the formula

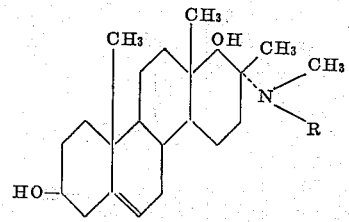

and acid-addition salts thereof, where R is chosen from the class consisting of hydrogen and lower alkyl radicals containing fewer than 4 carbon atoms.

2. 17α - methylamino - 17β - methyl - D - homoandrost-5-ene-3β,17a-diol hydrochloride.

3. 17α - dimethylamino - 17β - methyl - D - homoandrost-5-ene-3β,17a-diol hydrochloride.

4. 17α-dimethylamino - 17β - methyl - D-homoandrost-5-ene-3β,17a-diol L(+)-tartrate.

5. 17α - dimethylamino - 17β - methyl-D-homoandrost-5-ene-3β,17a-diol citrate.

6. 17α - methylethylamino - 17β - methyl-D-homoandrost-5-ene-3β,17a-diol hydrochloride.

References Cited by the Examiner

Cremlyn et al.: "Journal Chemical Soc. London," 1953, pages 1847–52.

Morrow et al.: "Chemistry & Industry," No. 37, Sept. 15, 1962.

CHARLES B. PARKER, *Primary Examiner.*

ROBERT V. HINES, *Assistant Examiner.*